Nov. 15, 1966     E. W. LOTHROP, JR     3,285,052
IMPACT TESTING APPARATUS
Filed May 13, 1964

United States Patent Office 3,285,052
Patented Nov. 15, 1966

3,285,052
IMPACT TESTING APPARATUS
Everett W. Lothrop, Jr., Media, Pa., assignor to FMC Corporation, Philadelphia, Pa., a corporation of Delaware
Filed May 13, 1964, Ser. No. 367,054
4 Claims. (Cl. 73—12)

The present invention relates to a device or apparatus for the impact testing of flexible strand material, particularly textiles and more especially to an improved means for holding a test specimen.

Impact testing is also referred to as high speed tensile testing, the object of the test being to determine the strength and/or other stress-strain properties of the test specimen under conditions of impact loading such as may be encountered for example in vehicle tires and parachute suspension lines. In order to obtain data which accurately reflects the true strength of the specimen it is necessary to hold the specimen in such a way and apply the impact force in such manner that the specimen breaks at its weakest point and not necessarily at the points where it is held or where the impact is applied. In other words the instrumentalities employed in carrying out the test should not in and of themselves damage the specimen merely because of the contact with the specimen but rather should cause the specimen to fail at its weakest point under the force exerted by the instrumentalities.

One known general type of impact testing apparatus comprises vertically spaced clamps for holding the ends of a test specimen. The upper clamp is connected to a force transducer or strain gauge and means is provided for moving the lower clamp very rapidly away from the upper clamp so as to impose an impact load on the specimen. In this known apparatus, after the specimen is secured in the clamps, the lower clamp is moved closer to the upper clamp so as to provide slack in the specimen and then moved in the opposite direction to produce the desired impact. In this manner the lower clamp is permitted to obtain full test speed before any strain is imposed on the specimen. Since it is ultimately the movement of the upper clamp which effects the test reading it is highly desirable that said clamp be light weight so as to have a low inertia and at the same time be strong enough to withstand repeated impacts. These opposed desiderata make it difficult to design a suitable arrangement.

Therefore it is an object of the present invention to provide an apparatus for the impact testing of flexible strand material wherein the test specimen is held in an improved manner which permits more accurate data to be obtained.

Another object of this invention is to provide, for use in an impact testing apparatus, an improved device for holding a test specimen.

Toward the attainment of the above and other objects the invention contemplates certain specific arrangements as will now be described with reference to the accompanying drawing wherein.

Figure 1:
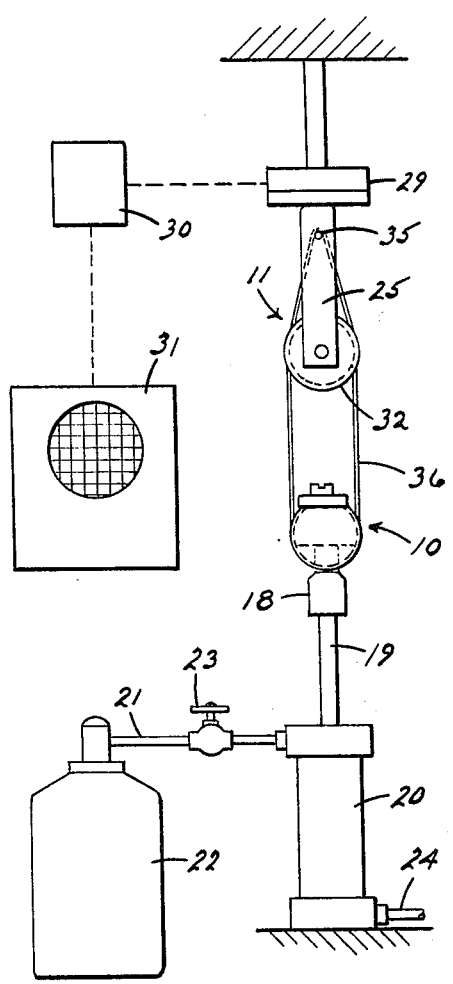
FIG. 1 is an overall more or less diagrammatic side elevational view of the testing apparatus.

As previously indicated the general arrangement of the testing apparatus is known in the prior art. Said apparatus comprises a lower clamp indicated generally at 10 and an upper specimen holding device indicated generally at 11. Clamp 10 comprises a member 12 having a rounded surface in which are provided two smooth-walled grooves 13 and 14. Member 12 has a flat upper surface 15 facing which is a flat surface of a clamping element 16 held in place by a bolt 17 which extends through element 16, main member 12 and screws into the end of a headed portion 18 of a piston 19. Piston 19 extends into a cylinder 20 to which is connected through a line 21 a high pressure gas supply 22. Flow of gas to the cylinder is controlled by a valve 23 and the lower end of said cylinder is vented through a line 24 also controlled by a valve, not shown. By a combination of valve openings, gas pressure and type of gas piston 19 may be moved downward from the position shown in FIG. 1 at controlled velocities up to about 600 inches per second. This type of system is known and used commercially and does not constitute a novel part of the present invention.

The upper specimen holding device 11, the construction of which constitutes the main feature of this invention, is in the form of a yoke member comprising a pair of straight, closely spaced, downwardly directed legs 25 and 26 interconnected at the upper ends by a cross bar 27. Secured to cross bar 27 is a threaded element 28 by means of which the device 11 may be attached to a suitable strain gauge or force transducer 29. Transducer 29 is connected through an amplifier 30 to the vertical deflection circuit of an oscilloscope 31.

Figure 2:
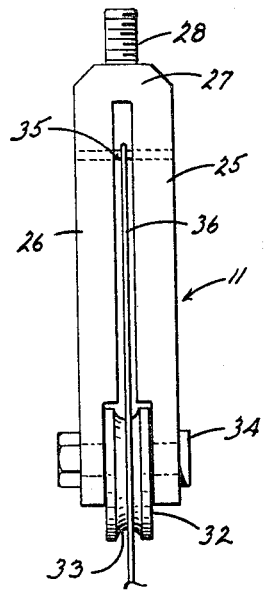
FIG. 2 is a side elevational view of the upper specimen engaging element of the testing apparatus.
Figure 3:
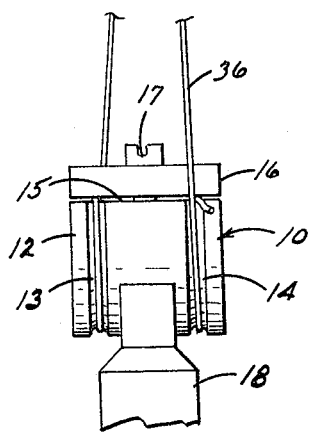
FIG. 3 is a side elevational view of a clamp for securing the ends of a test specimen.

Secured between the lower ends of legs 25 and 26 is a member 32 in the form of a pulley having a peripheral groove 33. Member 32 is supported on a bolt 34 or a suitable pin mounted in the legs 25 and 26 and may either be freely rotatable or fixed. As seen in FIG. 2, the lower ends of legs 25 and 26 are thinner than the upper portions and the groove 33 is slightly wider than the space between the upper portions of said legs. Between member 32 and cross bar 27, legs 25 and 26 are provided with aligned openings within which is mounted a readily breakable shear pin 35.

In readying the apparatus for performing a test, one end of the test specimen, for example, a length of tire cord 36, is inserted between the legs 25 and 26 above the shear pin 35 so that the specimen hangs on the pin. The end portions of the specimen are then positioned within the grooves 13 and 14 about member 12 of the lower clamp 10 and brought between the facing flat surfaces of members 12 and 16. Bolt 17 is then tightened to squeeze the specimen between members 12 and 16. Between pin 35 and the lower clamp 10 the specimen passes through a portion of the groove 33 of pulley 32. To perform the test, lower clamp 10 is moved rapidly downward from the FIG. 1 position. During the early part of this movement the loop of the specimen breaks shear pin 35 and by the time the descending loop reaches member 32, which may conveniently be referred to as a saddle, the lower clamp has attained full test speed so that the loop of the specimen strikes the saddle with the desired impact. Since groove 33 is slightly wider than the space between legs 25 and 26, proper landing of the specimen loop within the groove is assured. This impact is of course transmitted by the device 11 to the transducer 29 and the effect is readable on the oscilloscope 31 in the known manner. The saddle is not necessarily made in the form of a pulley but may be a cylindrical member without any groove or may be merely a member having smoothly curved upper surface for the specimen loop to land on.

Transducer 29 affects the vertical beam deflecting circuit of the oscilloscope but the horizontal sweep of the beam is instituted by the lower clamp 10. It is therefore important that the lower clamp be in a particular position at the time the load is applied to the specimen. With the present arrangement the specimen is initially held under light tension by the shear pin 35 and therefore the lower clamp will always have moved to a known position at the time the loop of the specimen makes impact against the saddle member 32 since a known amount of movement of the lower clamp is necessary to bring this about. Since the shear pin is readily breakable the transducer 29 is not affected to any appreciable degree by the early movement of the specimen. Instead of the shear pin 35, other ways of lightly holding the specimen loop may be employed, for example a light weight leaf spring attached at one end to leg 25 and having a free end in close proximity to leg 26 may be provided.

Figure 4:
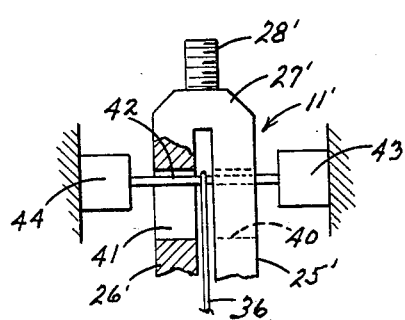
FIG. 4 is a fragmentary view showing a modified form of the invention.

FIG. 4 shows an embodiment of the invention wherein no force whatsoever is transmitted to transducer 29 until the loop of the specimen makes impact with saddle member 32. In this form of the invention the upper specimen holding device designated 11' comprises a yoke member having a pair of legs 25' and 26' interconnected at the upper ends by a cross bar 27' secured to which is a threaded element 28' by means of which the device is connected to transducer 29. Device 11' is generally similar to device 11 and has a saddle mounted between the lower ends, not shown, of legs 25' and 26'. Instead of aligned openings for holding a shear pin, legs 25' and 26' are respectively provided with aligned elongated slots 40 and 41 and through these slots loosely extends a shear pin 42 the ends of which are supported in stationary supports 43 and 44. The test specimen 36 is looped about the shear pin 42 so as to be held under light tension while the lower clamp is in the upper position as previously explained in connection with the other embodiment. When the lower clamp is moved downward, pin 42 breaks and permits the loop of the specimen to land under impact against the saddle. Since pin 42 is not connected to the device 11', the breaking of the pin has no effect upon transducer 29.

One of the main advantages of the present arrangement over the prior art is that the test specimen does not become slack once it has been positioned for the test. In the prior art when the lower clamp is raised to put slack in the specimen, the specimen sometimes becomes kinked and then when the lower clamp is moved downward to provide the impact load the kinked specimen breaks at an unrealistically low value. Another advantage of the present invention is that the upper specimen holding element may be lighter in weight than other clamps previously used in such equipment and as a result of this light weight and consequent low inertia the load on the specimen is more accurately reflected on strain gauge 29.

Having described a preferred form of the invention, what is claimed is:

1. For use in apparatus for impact testing of flexible strand material, a yoke comprising a pair of straight closely spaced parallel legs interconnected at one end by a cross bar, means on said cross bar for connecting said yoke to a force sensing element of a testing apparatus with the unconnected ends of the legs pointed downward, a saddle member secured between the lower unconnected ends of said legs, said saddle member having a curved surface facing the cross bar of said yoke and being adapted to be engaged by a loop of a test specimen during impact testing of the specimen, aligned openings through said legs, said openings being located between said saddle member and said cross bar and being adapted to have a loop supporting shear pin inserted therethrough, said shear pin being adapted to break upon a predetermined force being applied to the loop of the test specimen supported thereby.

2. Apparatus for impact testing of flexible strand material comprising a first device for gripping the ends of a test specimen so as to provide a loop in the specimen, a second device engageable with the loop in the specimen, a force sensing element supporting said second device, said first device having a normal position a preselected distance below said second device, said second device comprising yieldable means engageable with the loop of the test specimen to releasably hold the loop when said first device is in its normal position, means for rapidly moving said first device in a direction away from said second device to thereby pull the loop of the test specimen from said yieldable means, and said second device comprising means for catching the loop of the test specimen to thereby receive an impact produced by the rapid movement of said first device and transmit this impact to said force sensing element.

3. Apparatus for impact testing of flexible strand material comprising a first device for gripping the ends of a test specimen so as to provide a loop in the specimen, said device having a normal position, means for rapidly moving said device vertically downward from its normal position, a stationarily mounted means for holding the loop of the test specimen above said device with the specimen under light tension when said device is in its normal position, a second device having an impact receiving member located within the loop of the specimen below said stationarily mounted means whereby when said first device moves as aforesaid the loop of the test specimen lands on said impact receiving member, and a force sensing element supporting said second device.

4. For use in apparatus for impact testing of flexible strand material, a yoke comprising a pair of straight closely spaced parallel legs interconnected at one end by a cross bar, means on said cross bar for connecting said yoke to a force sensing element of a testing apparatus with the unconnected ends of the legs pointed downward, a saddle member secured between the lower unconnected ends of said legs, said saddle member having a curved surface facing the cross bar of said yoke and being adapted to be engaged by a loop of a test specimen during impact testing of the specimen, and means extending between said legs between said saddle member and said cross bar, said last named means being adapted to support the loop of the test specimen prior to the beginning of the test and to release said loop upon a predetermined force being applied to the loop in the direction of said saddle member.

References Cited by the Examiner

UNITED STATES PATENTS 1,456,596   5/1923   Hugentobler _____ 73—12 X
2,942,455   6/1960   Smith _____ 73—95 X RICHARD C. QUEISSER, *Primary Examiner.*

EDWARD D. GILHOOLY, *Assistant Examiner.*